United States Patent
Koskela et al.

(10) Patent No.: US 8,705,398 B2
(45) Date of Patent: Apr. 22, 2014

(54) MECHANISM FOR SIGNALING BUFFER STATUS INFORMATION

(75) Inventors: Timo Koskela, Oulu (FI); Sami-Jukka Hakola, Kempele (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 199 days.

(21) Appl. No.: 13/199,909

(22) Filed: Sep. 12, 2011

(65) Prior Publication Data

US 2013/0064103 A1    Mar. 14, 2013

(51) Int. Cl.
| | |
|---|---|
| G06F 11/00 | (2006.01) |
| G06F 3/14 | (2006.01) |
| H04L 12/26 | (2006.01) |
| H04W 4/00 | (2009.01) |
| H04W 72/00 | (2009.01) |
| G06F 15/16 | (2006.01) |
| G06F 3/00 | (2006.01) |
| G06F 5/00 | (2006.01) |

(52) U.S. Cl.
USPC ........... 370/252; 370/231; 370/235; 370/329; 455/450; 455/453; 709/232; 710/29; 710/52; 710/56

(58) Field of Classification Search
USPC ......... 370/180, 252, 254, 311, 312, 315, 328, 370/329, 330, 336, 338, 350, 390, 231, 370/235; 455/39, 3.01, 252, 255, 423, 454, 455/458, 422.1, 507, 509, 513, 450, 453; 709/232; 710/29, 52, 56
See application file for complete search history.

(56) References Cited

U.S. PATENT DOCUMENTS

| | | | |
|---|---|---|---|
| 7,054,790 B1 * | 5/2006 | Rich ............................ | 702/186 |
| 7,512,094 B1 | 3/2009 | Linebarger et al. .......... | 370/329 |
| 2004/0203815 A1 | 10/2004 | Shoemake et al. ............ | 455/450 |

(Continued)

FOREIGN PATENT DOCUMENTS

| | | |
|---|---|---|
| WO | WO-2010/005348 A1 | 1/2010 |
| WO | WO-2010/102668 A1 | 9/2010 |

(Continued)

OTHER PUBLICATIONS

Tdoc RP-110706, 3GPP TSG-RAN #52, "On the Need for a 3GPP Study on LTE Device-to-Device Discovery and Communication", Bratislava, Slovakia, May 31-Jun. 3, 2011, Qualcomm Incorporated, 2 pgs.

(Continued)

*Primary Examiner* — Alpus H Hsu
*Assistant Examiner* — Dharmesh Patel
(74) *Attorney, Agent, or Firm* — Stanton IP Law

(57) ABSTRACT

There is provided a mechanism for reporting buffer status information to a communication network control element when transmission via both a licensed and an unlicensed spectrum is conducted and offloading of traffic is executed. After an offloading value indicating the amount of traffic which can be offloaded from a transmission over a licensed spectrum to a transmission over an unlicensed spectrum is estimated, the UE determines a buffer size of at least one transmission buffer used in a transmission over the licensed spectrum and the unlicensed spectrum. Then, buffer status information is sent to the eNB wherein the estimated offloading value is considered. The eNB can then allocate resources for the transmission over the licensed band while benefits by the offloading to the unlicensed band are considered in the resource allocation.

17 Claims, 6 Drawing Sheets

(56) References Cited

U.S. PATENT DOCUMENTS

| | | | |
|---|---|---|---|
| 2006/0223524 A1 | 10/2006 | Ginzburg | 455/424 |
| 2009/0125650 A1* | 5/2009 | Sebire | 710/57 |
| 2010/0098011 A1* | 4/2010 | Pelletier et al. | 370/329 |
| 2010/0191878 A1* | 7/2010 | Nandagopalan et al. | 710/56 |
| 2010/0226430 A1* | 9/2010 | Hamilton et al. | 375/240.03 |
| 2011/0028102 A1* | 2/2011 | Li et al. | 455/71 |
| 2011/0141983 A1* | 6/2011 | Hong | 370/329 |

FOREIGN PATENT DOCUMENTS

| | | |
|---|---|---|
| WO | WO 2010/111150 A2 | 9/2010 |
| WO | WO 2010102668 A1 * | 9/2010 |
| WO | WO-2011/151508 A1 | 12/2011 |

OTHER PUBLICATIONS

Tdoc RP-110707, TSG-RAN #52, "Study on LTE Device to Device Discovery and Communication—Radio Aspects", Bratislava, Slovakia, May 31-Jun. 3, 2011, Qualcomm Incorporated, 5 pgs.

Tdoc RP-110708, TSG-RAN #52, "Study on LTE Device to Device Discovery and Communication—Service and System Aspects", Bratislava, Slovakia, May 31-Jun. 3, 2011, Qualcomm Incorporated, 5 pgs.

3GPP TS 36.321 V10.2.0 (2011-06), "3$^{rd}$ Generation Partnership Project; Technical specification Group Radio Access Network; Evolved Universal Terrestrial Radio Access (E-UTRA); Medium Access Control (MAC) Protocol Specification (Release 10)", 54 pgs.

Sesia, et al., "LTE, The UMTS Long Term Evolution: From Theory to Practice", Wiley (2009), (1 page).

* cited by examiner

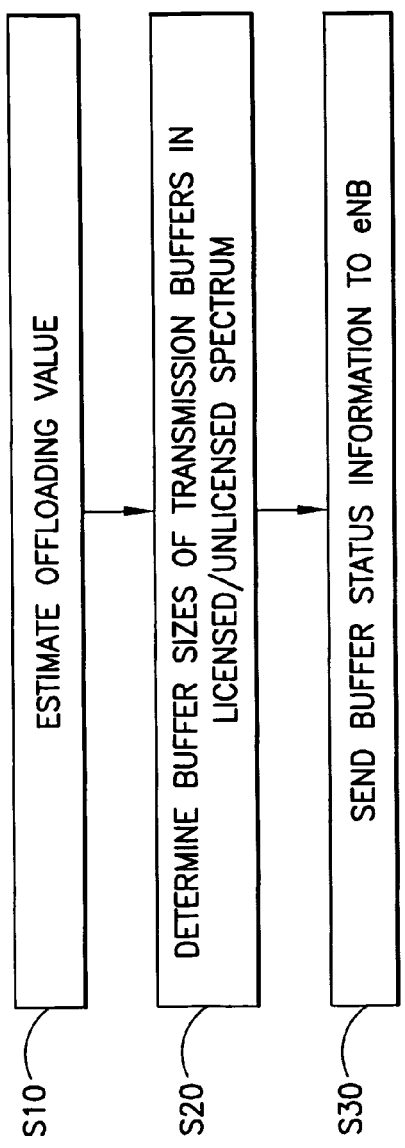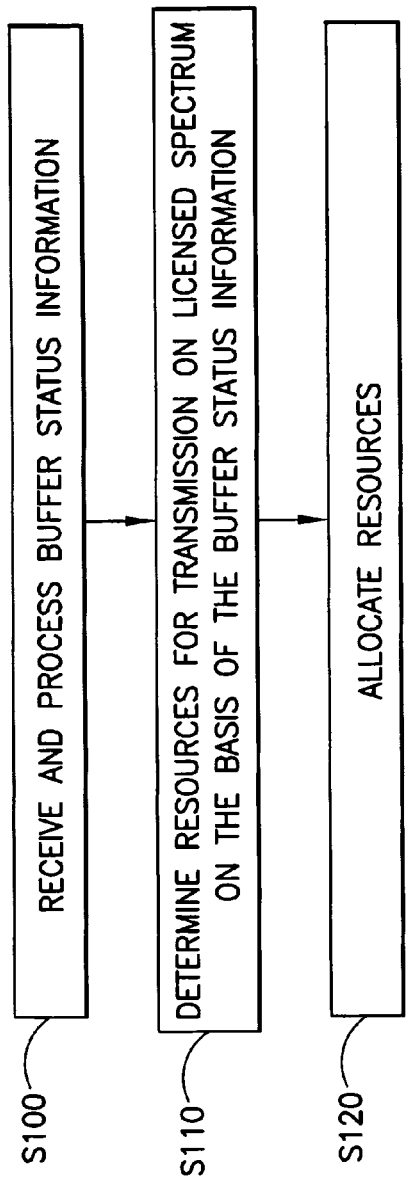

MECHANISM FOR SIGNALING BUFFER STATUS INFORMATION

BACKGROUND OF THE INVENTION

1. Field of the Invention

The present invention relates to a mechanism usable for signaling buffer status information for communication over licensed and unlicensed spectrum. In particular, the present invention is related to apparatuses, methods and computer program products providing a mechanism by means of which buffer status information can be signaled to the network wherein communication resources in licensed and unlicensed spectrums are considered, in particular in an offloading case where traffic is offloaded from a transmission via one spectrum to a transmission via another spectrum.

2. Related Background Art

Prior art which is related to this technical field can e.g. be found by the technical specification 3GPP TS 36.321, for example according to version 10.2.0.

The following meanings for the abbreviations used in this specification apply:
ABS: actual buffer size
BS: base station
BSR: buffer status report
D2D: device-to-device
DL: downlink
eNB: enhanced node B
EGTA: estimated offloading traffic amount
ISM: industrial, scientific and medical
LTE: Long Term Evolution
LTE-A: LTE Advanced
LS: licensed spectrum
MAC: medium access control
NM: normal mode
OM: offloading mode
RB: radio bearer
RBG: radio bearer group
RRC: radio resource control
VBS: virtual bearer size
UE: user equipment
UL: uplink
UL-SCH: uplink shared channel
US: unlicensed spectrum In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Recently, so-called "proximity-based" applications and services came into the focus of further developments in the field of telecommunications. The term proximity-based applications and services may be used, for example, in cases where two or more devices (i.e. two or more users), which are close to each other, are interested in exchanging data, if possible, directly with each other.

Currently, such "proximity-based" applications operate fully "over the top" and are based on "high-level software", typically relying on a mix of GPS location and of the 3GPP mobile systems used as "data pipes".

However, such an approach presents fundamental technology limitations from the point of view of e.g. device battery life (due to the extensive GPS usage), signaling load to the network (due to the required uplink bursty traffic) and simplicity (due to the "proactive" behavior required of the user, e.g. the "check in").

While the use of an unlicensed-spectrum communication can address some of the aspects mentioned earlier, it still presents some limitations. For example, discovery processes are being defined based on direct message exchanges and thus not optimal for operation over longer ranges (hundreds of meters or more), or preserve a reasonable battery life. For the same reason, an unlicensed option cannot be expected to scale among a large number of devices.

For future cellular communication networks, a possible method for such proximity-based applications and services is the so-called device-to-device (D2D) communication. D2D offers a high communication speed, large capacity and a high quality of service which are important features to be achieved. Advantages achievable by the implementation of D2D communications in the cellular communication environment are, for example, an offloading of the cellular system, reduced battery consumption due to lower transmission power, an increased data rate, an improvement in local area coverage robustness to infrastructure failures and also an enablement of new services. This is possible while also providing access to licensed spectrum with a controlled interference environment to avoid the uncertainties of license exempt band. Due to this, D2D communication gains more and more attraction and interest.

However, in order to make a D2D communication applicable to communication networks, such as those based on 3GPP LTE systems, it is necessary to evolve a suitable platform in order to intercept the demand of proximity-based applications so that it is possible that devices, such as UEs or the like, can discover each other directly over the air, and potentially communicate directly, wherein a certain level of control for the network operator side has to be maintained so that D2D communication makes sense from a system management point of view.

For example, if a device (such as a UE) uses simultaneously licensed (i.e. cellular) and unlicensed spectrum, e.g. via inter-band carrier aggregation methods it is required to enable the network, i.e. a communication network control element (such as an eNB) which schedules transmission over the licensed spectrum and allocates also the necessary resources, to conduct a suitable control balancing the actual need of resources of the device in question and the totally available resources in particular at the licensed spectrum.

SUMMARY OF THE INVENTION

It is an object of the invention to provide an apparatus, method and computer program product by means of which an improved mechanism usable for signaling buffer status information for communication over licensed and unlicensed spectrum. In particular, it is an object of the invention to provide an apparatus, method and computer program product by means of which a communication network control element can be provided with information about an actual requirement of resources on a communication spectrum, in particular a licensed spectrum, when traffic can be offloaded to another transmission type or communication spectrum, e.g. an unlicensed spectrum.

This object is achieved by the measures defined in the attached claims.

According to an example of an embodiment of the proposed solution, there is provided, for example, an apparatus comprising an estimating processing portion configured to estimate an offloading value indicating an amount of traffic which can be offloaded from a transmission over a licensed spectrum to a transmission over an unlicensed spectrum, a determining processing portion configured to determine a buffer size of at least one transmission buffer used in a transmission over the licensed spectrum and the unlicensed spectrum, and a buffer status information transmission processing portion configured to send a buffer status information indicating the buffer size for transmission over the licensed spectrum under consideration of the estimated offloading value.

Furthermore, according to an example of an embodiment of the proposed solution, there is provided, for example, a method comprising estimating an offloading value indicating an amount of traffic which can be offloaded from a transmission over a licensed spectrum to a transmission over an unlicensed spectrum, determining a buffer size of at least one transmission buffer used in a transmission over the licensed spectrum and the unlicensed spectrum, and sending a buffer status information indicating the buffer size for transmission over the licensed spectrum under consideration of the estimated offloading value.

According to a further example of an embodiment of the proposed solution, there is provided, for example, an apparatus comprising a buffer status information receiving portion configured to receive and process a buffer status information indicating a buffer size for transmission over a licensed spectrum, wherein the buffer status information considers an estimated offloading value indicating an amount of traffic which can be offloaded from a transmission over a licensed spectrum to a transmission over an unlicensed spectrum, a resource determination portion configured to determine, on the basis of the received buffer status information, required resources for a transmission over the licensed spectrum, and a resource allocation portion configured to allocate the determined resources to a transmission over the licensed spectrum.

Furthermore, according to the further example of an embodiment of the proposed solution, there is provided, for example, a method comprising receiving and processing a buffer status information indicating a buffer size for transmission over a licensed spectrum, wherein the buffer status information considers an estimated offloading value indicating an amount of traffic which can be offloaded from a transmission over a licensed spectrum to a transmission over an unlicensed spectrum, determining, on the basis of the received buffer status information, required resources for a transmission over the licensed spectrum, and allocating the determined resources to a transmission over the licensed spectrum.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to signal buffer status information for communication over licensed and unlicensed spectrum in such a manner that the network, i.e. a corresponding communication network control element, obtains information about how many resources the device needs. That is, it is possible that the device, e.g. a UE, can indicate to the network that it needs actually a reduced amount of resources for transmission on one spectrum, e.g. a licensed, due to offloading traffic from this spectrum. Furthermore, according to examples of embodiments of the invention, the proposed mechanism is easy to be implemented as existing signaling procedures can be used. Furthermore, it is possible to utilize a reinterpretation of current specified messages but the scheme works also without reinterpretation The above and still further objects, features and advantages of the invention will become more apparent upon referring to the description and the accompanying drawings.

BRIEF DESCRIPTION OF THE DRAWINGS

FIG. 4 shows a flow chart illustrating a procedure for signaling buffer status information conducted in a communication network element according to examples of embodiments of the invention.

FIG. 5 show a flow chart illustrating a procedure for processing buffer status information conducted in a communication network control element according to examples of embodiments of the invention.

DESCRIPTION OF PREFERRED EMBODIMENTS

Figure 1:
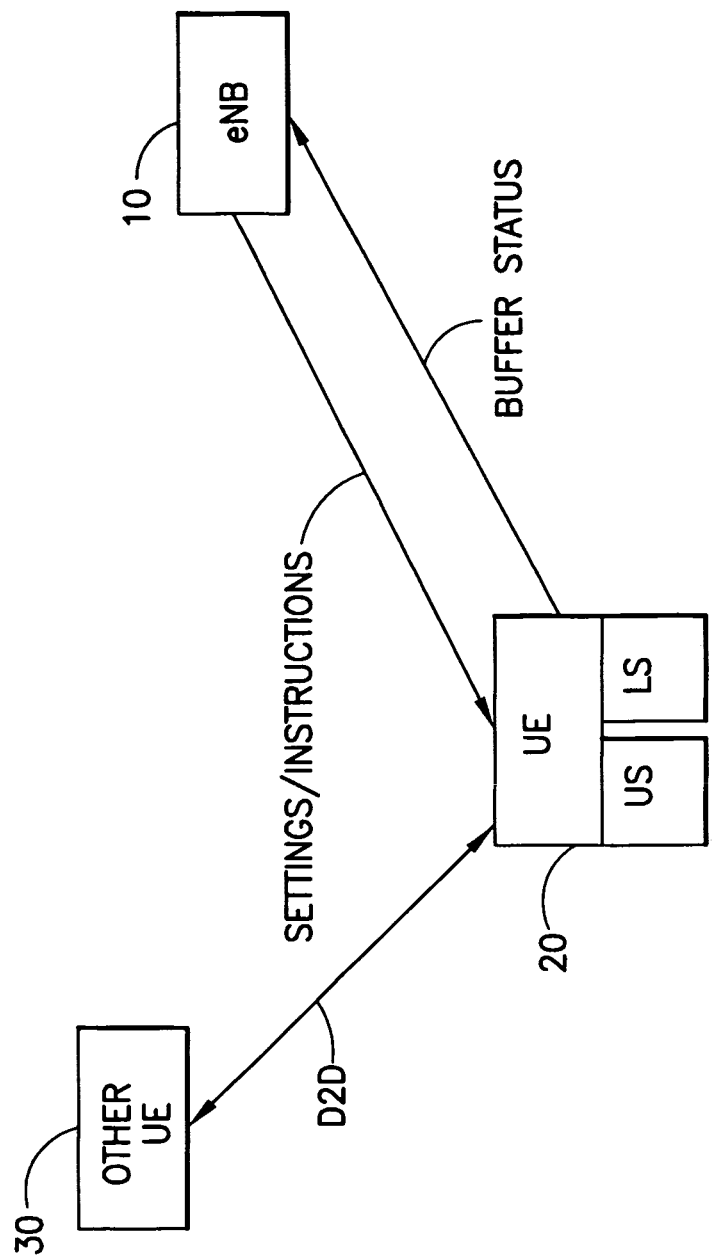
FIG. 1 shows a diagram illustrating a configuration of a communication system in which examples of embodiments of the invention can be implemented.

In the following, examples and embodiments of the present invention are described with reference to the drawings. For illustrating the present invention, the examples and embodiments will be described in connection with a cellular communication network based on a 3GPP LTE system. However, it is to be noted that the present invention is not limited to an application using such types of communication system, but is also applicable in other types of communication systems and the like.

A basic system architecture of a communication system where examples of embodiments of the invention are applicable may comprise a commonly known architecture of one or more communication networks comprising a wired or wireless access network subsystem and a core network. Such an architecture may comprise one or more access network control elements, radio access network elements, access service network gateways or base transceiver stations, such as a base station (BS) or eNB, with which a communication network element or device such as a UE or another device having a similar function, such as a modem chipset, a chip, a module etc., which can also be part of a UE or attached as a separate element to a UE, or the like, is capable to communicate via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication connection to or from UEs or eNBs, besides those described in detail herein below.

Furthermore, the described network elements, such as communication network elements like UEs or communication network control elements like BSs or eNBs, and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

In network controlled D2D and in simultaneous use of licensed and unlicensed spectrum by the communication system, such as the LTE system, one commonality is the some level autonomous resource usage by the devices or UEs in a D2D communication and devices or UEs which are scheduled or use resources on unlicensed spectrum due to regulations (e.g. regulations of ISM), in comparison to usage of fully scheduled radio resources on a licensed spectrum (controlled by an eNB or the like).

For a scheduler element, which is for example part of the communication network control element or connected therewith, in order to make proper scheduling decision, examples of embodiments of the invention provide a mechanism so as to inform the communication network control element about the data amount at the devices that is to be sent over licensed spectrum or for example via D2D resources (e.g. licensed or unlicensed spectrum) in case of a D2D communication. In particular, as a resource allocation among devices or UEs in a D2D connection may possibly not accurately followed by the scheduling eNB, in order to consider corresponding resource allocations, the device provides the eNB with information about the data amount at the devices that is to be sent over licensed and unlicensed spectrum e.g. in case of a D2D communication or the like, so as to enable the eNB to make proper scheduling decisions among devices.

By means of this, it is possible that the communication network control element, such as the eNB, can conduct a proper control, i.e. allocation of resources on the licensed band, for different connection types, such as connection of devices with only a cellular communication mode on licensed spectrum, of devices with a cellular and a D2D communication mode on licensed spectrum, of devices with a cellular communication mode on both licensed and unlicensed spectrum, and of devices with a cellular communication mode on licensed spectrum and a D2D communication mode on unlicensed spectrum.

In other words, according to examples of embodiments of the invention, information can be conveyed to the communication network control element, such as the eNB, about the share of controlled data, i.e. data transmitted in a scheduled manner on a licensed spectrum, and the share of at least partially non-controlled data, i.e. data sent in a D2D communication or data sent over unlicensed spectrum (data for which no resources on the licensed spectrum have to be allocated by the eNB), in order to enable the communication network control element to make a resource allocation onto the licensed spectrum which does not overestimate the data amount to be transmitted, i.e. a resource allocation which does not unnecessarily decrease the amount of available resources for other users.

FIG. 1 shows a diagram illustrating a configuration of a communication system in which examples of embodiments of the invention can be implemented. It is to be noted that FIG. 1 shows a simplified architecture of an exemplary communication system for illustrating a scenario where examples of embodiments of the present invention are applicable. Specifically, FIG. 1 shows a 3GPP LTE based communication network configuration where a base station, i.e. an eNB 10, is provided and a UE 20 is located in a cell region where communication with the eNB 10 is possible.

It is to be noted that the network architecture shown in FIG. 1 depicts only those network elements which are useful for understanding the principles of the examples of embodiments of the invention. As known by those skilled in the art there are several other network elements involved in the establishment, control and management of a communication connection which are omitted here for the sake of simplicity.

Referring to FIG. 1, reference sign 10 denotes the eNB as an example for a communication network control element. Reference sign 20 denotes a communication network element, such as a UE, which is capable of conducting a communication via an interface to a shared or unlicensed spectrum (indicated by US in FIG. 1), and of conducting a communication via an interface to a licensed spectrum (indicated by LS in FIG. 1). The eNB 10 receives, according to examples of embodiments of the invention, specific buffer status information from the UE 20, while the UE 20 receives from the eNB 10 setting information (configuration information) and corresponding instructions to follow the setting information.

It is to be noted that the eNB 10 may serve more than one cell or operators, or may include sub-cells which are served by own base transceiver stations. Furthermore, the eNB 10 may control more than one UE.

Reference sign 30 denotes another UE or communication network element with which the UE 20 can conduce a D2D communication, for example, e.g. via an unlicensed spectrum.

According to examples of embodiments of the invention, the UE 20 is a device which is capable of offloading traffic from a band of one spectrum to a band of another spectrum, such as to offload traffic from the licensed spectrum to the shared spectrum while sharing a common transmission buffer with the transmission over a radio interface able to communicate on a licensed band.

It is to be noted that the offloading of traffic may be executed, for example, in a communication between an access point and the UE 20, for example to a shared band, but also in a communication between devices (i.e. a D2D communication), for example, to a licensed band, or a combination of communications and offloading targets as indicated in the above discussed list of different connection types. That is, any combination (from UE point of view) is applicable where the UE may have both cellular and D2D modes active simultaneously, and traffic of both modes can be conveyed both in licensed and shared/unlicensed spectrum. As a result of offloading, there are necessary less resources on the transmission bands of the offloaded spectrum by using resources on transmission bands of the spectrum to which the traffic is offloaded. Therefore, offloading is of interest in particular with regard to licensed spectrum having a scarcity of resources.

In order to inform the network about the amount of data at the devices (UE) to be transmitted in the UL direction, i.e. of data stored in UL transmission buffers, for example, the device may transmit buffer status information periodically or at specific events to the communication network control element, for example the eNB. On the basis of such buffer status information, the communication network control element can decide on an allocation of resources to the respective connection of the UE.

In the following, a mechanism for reporting buffer status information based on 3GPP MAC specification, which is utilized in 3GPP LTE systems, is described in connection with FIGS. 2 and 3.

Figure 2:
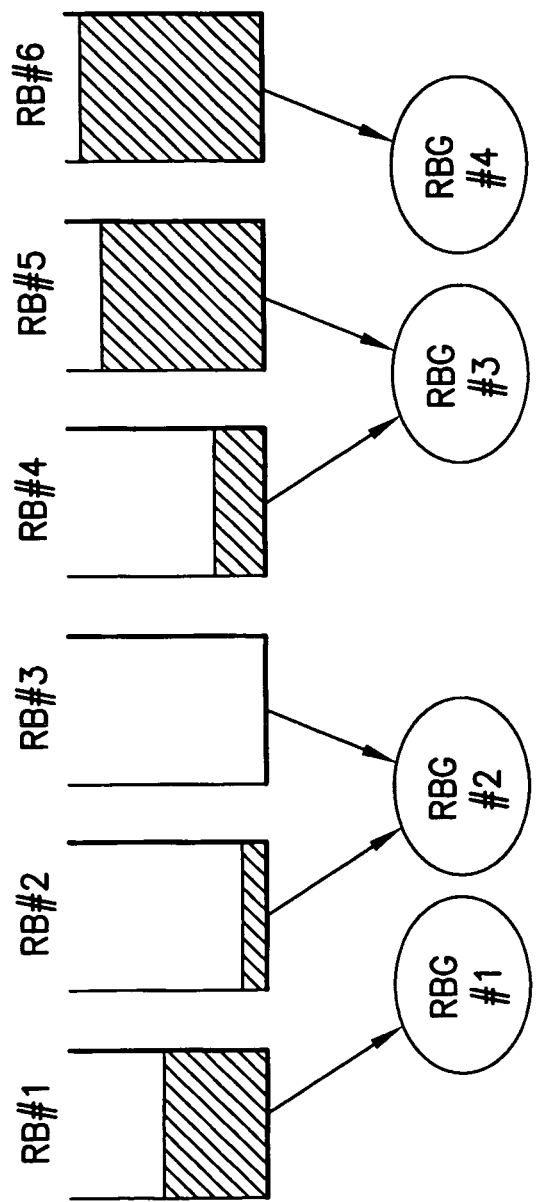
FIG. 2 shows a diagram illustrating a grouping of radio bearers into radio bearer groups used as a basis for signaling buffer status information to the network.

FIG. 2 shows a diagram illustrating a grouping of radio bearers into radio bearer groups used as a basis for signaling buffer status information to the network. FIG. 3 shows a diagram illustrating a structure of buffer status reports forming an example of buffer status information used in examples of embodiments of the invention.

In a LTE based communication system, in order to inform the network about the status of transmission buffers at a device, buffer status reports (BSRs) from the UE to the eNB are used which assist the eNB in its decision for allocating UL resources. BSRs are necessary since in the UL direction because scheduling decisions are performed in the communication network control element (the eNB) while the transmission buffer for the data (and hence the initial information about the amount of data to be transmitted) is located in the UE. Therefore, the BSRs are sent from the UE to the eNB by using a MAC control element so as to indicate the amount of data in the UE that needs to be transmitted over UL-SCH.

BSR reporting may be controlled on the basis of e.g. two timers, i.e. periodicBSR-Timer (also referred to as periodic timer) and retxBSR-Timer (also referred to as regular time). Transmission of a BSR may be triggered, for example, when one of the timers expires, or when a specific event occurs, e.g. when UL data for a logical channel with higher priority becomes available for transmission, or other events being known to those skilled in the art.

According to 3GPP specification, buffer status information are transmitted on a per radio bearer group basis. FIG. 2 shows an example of a grouping or mapping of radio bearers into RBGs. Specifically, as shown in FIG. 2, a maximum of four RBGs, i.e. RBG#1, RBG#2, RBG#3 and RBG#4 are formed from different radio bearers RB#1 to RB#6, wherein one RBG may be formed by RBs having e.g. similar QoS requirements. It is to be noted that while FIG. 2 shows four RBGs, in accordance with the maximum number of RBGs according to 3GPP, examples of embodiments of the invention are also usable with less or more RBGs or similar constructions, as long as a basis for a transmission of buffer status information is provided.

The buffer status of the radio bearers (the boxes at the RBs indicate an example of a transmission buffer wherein the grey portions represents a corresponding amount of data for transmission) mapped to a respective RBG is sent in the form of an BSR to the communication network control element.

Figure 3:
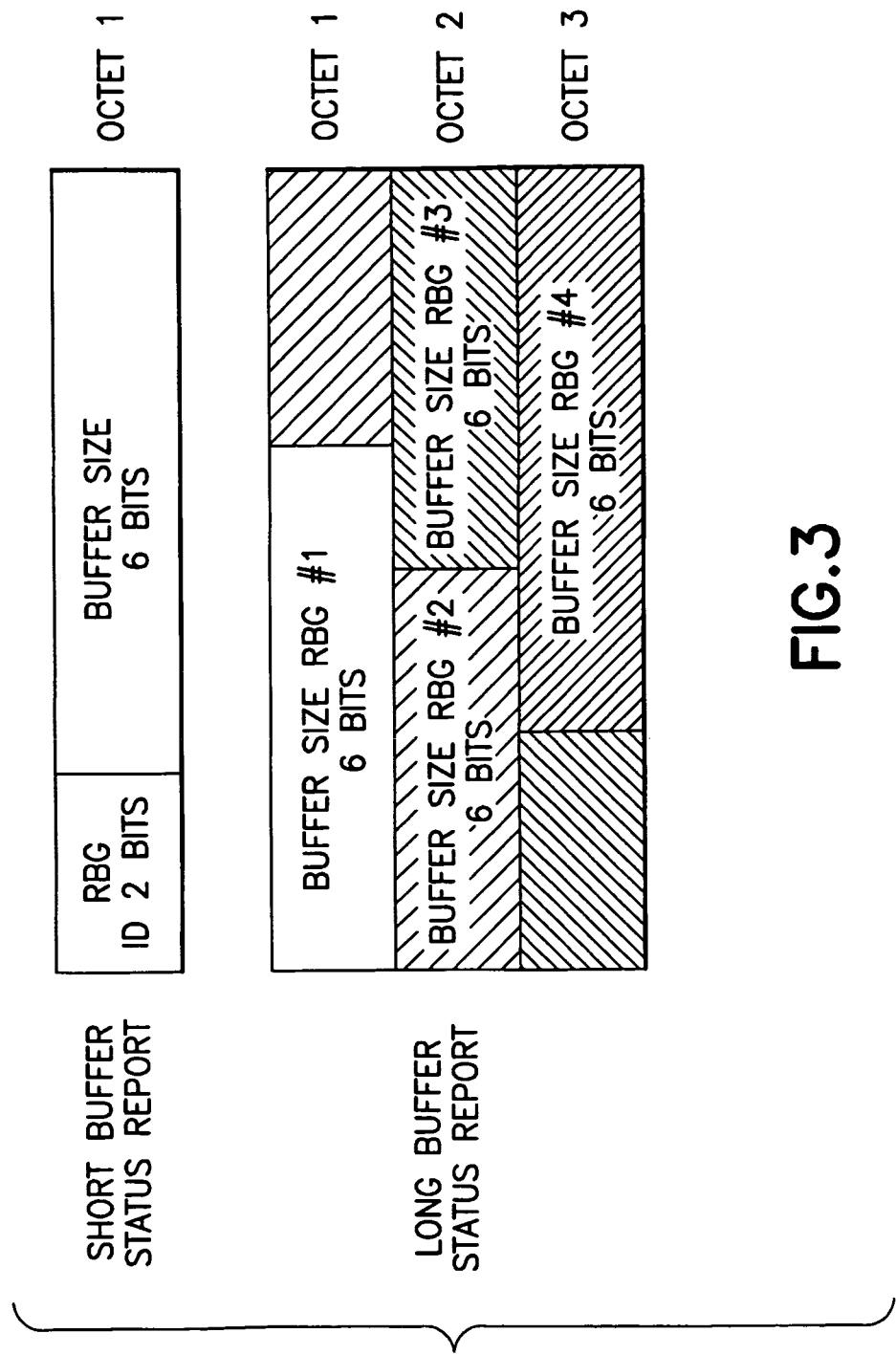
FIG. 3 shows a diagram illustrating a structure of buffer status reports forming an example of buffer status information used in examples of embodiments of the invention.

For the transmission of the buffer status by means of the BSR, there are two types of BSR defined in LTE, which are illustrated in FIG. 3. The first type is a so-called short buffer status report, and the second type is a so-called long buffer status report BSR.

In the short BSR, the RBG to which the BSR is related is identified in a first field (e.g. 2 bits Ion), while the actual value of the buffer size is added in a second field (e.g. 6 bits long); that is, the short BSR is sent for only one RBG.

On the other hand, in the long BSR, the buffer sizes of each RBG is indicated in a corresponding field in a consecutive manner (i.e. starting from RBG#1 and ending at RBG#4), wherein each field is e.g. 6 bits long.

Which one of the long and short BSR is transmitted may depend, for example, on the amount of available uplink transmission resources for sending the BSR, on how many groups of logical channels have non-empty buffers, and on whether a specific event is triggered at the UE.

In the following, examples of embodiments of the invention are described in which buffer status information is transmitted from a communication network element, such as e.g. UE 20 in FIG. 1, is transmitted to a communication network control element, such as the eNB 10 in FIG. 1, and the buffer status information is processed for deciding on the allocation of resources for transmission over at least one spectrum, e.g. the licensed spectrum. According to some of the following examples, the communication network control element is also arranged to configure a setting of the communication network element with regard to the content of buffer status information, and to conduct a specific processing in accordance with a mode indication of the communication network element.

FIG. 4 shows a flow chart illustrating a basic procedure for signaling buffer status information which conducted in a communication network element according to examples of embodiments of the invention. On the other hand, in FIG. 5, a flow chart is shown illustrating a procedure for processing the buffer status information which is conducted in a communication network control element according to examples of embodiments of the invention.

According to FIG. 4, in step S10, when a communication network element such as the UE 20 according to FIG. 1 conduct an offloading processing for offloading traffic from a transmission via one spectrum, e.g. licensed spectrum, to a transmission via another spectrum, e.g. unlicensed spectrum, an offloading value is estimated which indicates an amount of traffic which can be offloaded from the transmission over the licensed spectrum to a transmission over the unlicensed spectrum. That is, the offloading value gives an estimate about an amount of resources (transmission capacity, bandwidth etc.) which can be spared on the licensed spectrum for transmitting data in the transmission buffers in the UL direction due to the shift of the data to the transmission over the unlicensed spectrum.

For example, the offloading value may be estimated on the basis of history information and a result of a throughput calculation related to a preceding offloading of traffic to the unlicensed spectrum, i.e. based on a preceding offloading result. Also other manners of determining the offloading value are conceivable.

Then, in step S20, the UE 20 determines buffer sizes of transmission buffers used in a transmission over the licensed spectrum and the unlicensed spectrum. For examples, the buffer sizes indicated in FIG. 2 are determined on a per RBG basis.

Then, in step S30, the UE 20 sends buffer status information to the eNB 10 for indicating the sizes of the transmission buffers for a transmission over the licensed spectrum wherein the estimated offloading value is considered in the buffer size information. In other words, the UE 20 informs the eNB about the amount of data stored in the transmission buffers but the information sent to the eNB 10 considers also a reduction of the total amount by the amount of data which can be offloaded to the other spectrum transmission, for example to the unlicensed spectrum. For example, the value of buffer sizes sent to the eNB 10 may be a result of a subtraction of the actual buffer size and the offloading value, i.e. a value which represents an amount of data which is finally to be transmitted via the controlled, i.e. licensed spectrum.

On the other hand, according to FIG. 5, in step S100, the communication network control element, such as the eNB 10 of FIG. 1, receives and processes buffer status information from a UE (e.g. UE 20) indicating a buffer size for transmission over the licensed spectrum (i.e. the buffer size information sent in step S30 of FIG. 4, for example). That is, the buffer status information received in step S100 considers an estimated offloading value indicating an amount of traffic which can be offloaded from a transmission over the licensed spectrum to a transmission over the unlicensed spectrum, for example.

Then, in step S110, on the basis of the received buffer status information, i.e. under consideration of the amount of data which can be offloaded to the unlicensed spectrum, the eNB 10 determines the required resources for the transmission of the data in the transmission buffers of the UE over the licensed spectrum, wherein the availability of resources is taken into account (e.g. based on overall traffic amount, transmission restrictions etc.). Thereafter, in step S120, the eNB 10 allocates the determined resources to the UL transmission of the UE 20 on the licensed spectrum.

According to one example of an embodiment of the invention, the UE 20 determines, as buffer sizes for the buffer size information, values of an actual buffer size and of a virtual buffer size. For example, according to the present example of embodiments of the invention, the UE 20 calculates the actual buffer size on the basis of the total amount of data in the transmission buffers of the RBG(s) in question, e.g. by combining the values of the buffer sizes of the different priority buffers, and calculates then the virtual buffer size by subtracting an offloading value from the actual buffer size. Thus, the virtual buffer size indicates the buffer size (or amount of data) being relevant for operation on the licensed spectrum as it considers the amount of data (deducted from the total amount of data) which can be offloaded to the unlicensed spectrum. In other words, on the basis of the actual buffer size and the virtual buffer size, the extra resources obtained from the offloading can be determined. For example, the virtual buffer size is:

$$VBS = ABS - EOTA, \text{ where}$$

ABS is Actual Buffer Size, EOTA is Estimated Offloading Traffic Amount (offloading value), and VBS is Virtual Buffer Size.

According to examples of embodiments of the invention, the buffer size information comprises both the ABS and the VBS values.

The virtual buffer size may be, for example, a MAC buffer size.

According to a further example of embodiments of the invention, instead of transmitting in the buffer size information both of the ABS and the VBS to the eNB 10, it is possible to transmit only the VBS in case of offloading traffic.

According to further examples of embodiments of the invention, the transmission of the buffer size information considers a status of the connection to which traffic can be offloaded. For example, in case it is determined that the offloading connection is terminated, or in case that an idle state for the offloading connection is determined to be present for a predetermined time, the VBS is set to the ABS, and only the ABS is reported to the network.

In a still further example of embodiments of the invention, it is possible that the VBS value is indicated to be a negative value. This may be the case, for example, in case the offloading value can be greater than the ABS, or in case that additional resources are assumed to be present in the unlicensed spectrum so that not only all data in the considered transmission buffer can be transmitted but even more than that. In other another words, a negative VBS value is assumed when more resources on the unlicensed band are determined to be available than being necessary for covering the present need of the UE.

When the network, i.e. the communication network control element like the eNB 10 receives the negative VBS, it is recognized by the network that there are further resources available on the unlicensed spectrum which are usable for offloading. In other words, when the eNB 10 determines a negative value for the VBS, in particular from plural devices or UEs, it recognizes that there are resources available on the unlicensed spectrum which would allow an even more aggressive offloading According to a further example of embodiments of the invention, the device (UE 20) can assume specific modes corresponding to the fact whether offloading is conducted or not. For example, in case offloading is conducted, an offloading mode (OM) is assumed which is also indicated towards the eNB 10. Otherwise, in case no offloading is conducted, a normal mode (NM) may be assumed which is also indicated to the network.

Depending on the mode indicated by a device (UE 20), the communication network control element (eNB 10) is arranged to interpret the buffer status information, such as a BSR, in different manners.

Assuming an example where there are only 4 RBGs, as indicated above with regard to the LTE system. When it is determined that the UE 20 is in OM, the buffer size information related to one RBG is interpreted as representing a "negative" buffer size. Then, the buffer size of this RBG (i.e. the negative buffer size amount) is deducted from the total buffer size of the other (three) RBGs. Negative values may indicate indirectly, if multiple devices report negative values, to the eNB that there are resources available on unlicensed spectrum and would allow even more aggressive offloading as one example. That is, allowing negative value allows above mentioned indirect way of assessing the availability of unlicensed spectrum on resources used for the offloading.

Alternatively, when the UE 20 is in OM, the eNB 10 may be configured to use one RBG buffer size for the decision on the resources to be allocated.

Furthermore, in another alternative, when the UE 20 is in OM, the network is arranged to restrict the VBS reporting by device (i.e. by UE) and set the OM mode operation as normal mode (NM). This may be configured by the communication network control element, i.e. the eNB 10, at the UE 20 by means of a corresponding signaling instructing the UE 20 to enter NM, for example.

It is to be noted that in case the UE 20 is in NM, the eNB 10 is configured to process the buffer status information in a conventional manner, i.e. the network interprets the BSR normally.

According to a further example of embodiments of the invention, the network, i.e. the communication network control element such as the eNB 10 is arranged to configure which logical channels or RBGs the UE 20 has to use for determining the a buffer size, such as the ABS value, when the UE 20 is conducting offloading.

Figure 6:
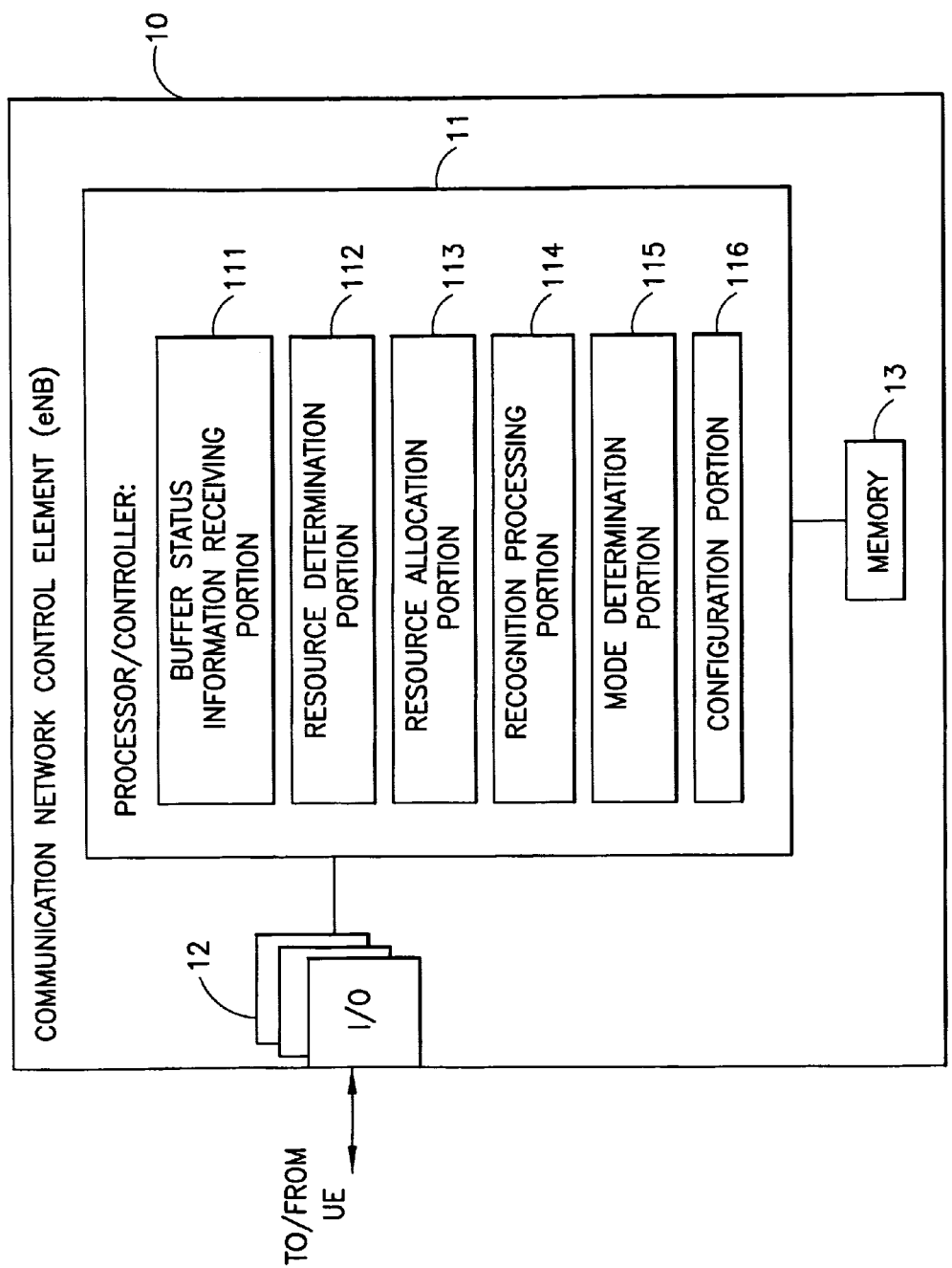
FIG. 6 shows a block circuit diagram of a communication network control element including processing portions conducting functions according to examples of embodiments of the invention.

In FIG. 6, a block circuit diagram illustrating a configuration of a communication network control element, such as an eNB, is shown, which is configured to implement the processing for allocating resources on the basis of buffer status information as described in connection with the examples of embodiments of the invention. It is to be noted that the communication network control device or eNB 10 shown in FIG. 6 may comprise several further elements or functions besides those described herein below, which are omitted herein for the sake of simplicity as they are not essential for understanding the invention. Furthermore, even though reference is made to an eNB, the communication network element may be also another device having a similar function, such as a modem chipset, a chip, a module etc., which can also be part of a BS or attached as a separate element to a BS, or the like.

The communication network control element or eNB 10 may comprise a processing function or processor 11, such as a CPU or the like, which executes instructions given by programs or the like related to the buffer status information processing and control of the UE related to the buffer status reporting. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denote transceiver or input/output (I/O) unit connected to the processor 11. The I/O unit 12 may be used for communicating with a communication network element like a UE. The I/O unit 12 may be a combined unit comprising communication equipment towards several network elements, or may comprise a distributed structure with a plurality of different interfaces for different network elements. Reference sign 13 denotes a memory usable, for example, for storing data and programs to be executed by the processor 11 and/or as a working storage of the processor 11.

The processor 11 is configured to execute processing related to the above described mechanism related to the buffer status reporting. In particular, the processor 11 comprises a sub-portion 111 as a processing portion which is usable as a buffer status information receiving portion. The portion 111 may be configured to perform processing according to step S100 according to FIG. 5, for example. Furthermore, the processor 11 comprises a sub-portion 112 as a processing portion which is usable as a resource determination portion. The portion 112 may be configured, for example, to perform processing according to step S110 according to FIG. 5, for example. Moreover, the processor 11 comprises a sub-portion 113 as a processing portion which is usable as a resource allocation portion. The portion 113 may be configured, for example, to perform a processing according to step S120 according to FIG. 5, for example. In addition, the processor 11 comprises a sub-portion 114 as a processing portion which is usable as a recognition processing portion configured to recognize that the availability of further resources for offloading, e.g. from a negative virtual buffer size. Moreover, the processor 11 comprises a sub-portion 115 as a processing portion which is usable as a mode determination portion configured to determine the mode of a UE or the like as being in an offloading mode or a normal mode. In addition, the processor 11 comprises a sub-portion 116 as a processing portion which is usable as a configuration portion configured to send configuration information to a UE or the like for defining logical channels or RBGs to be used in a determination of an actual buffer size or the like.

Figure 7:
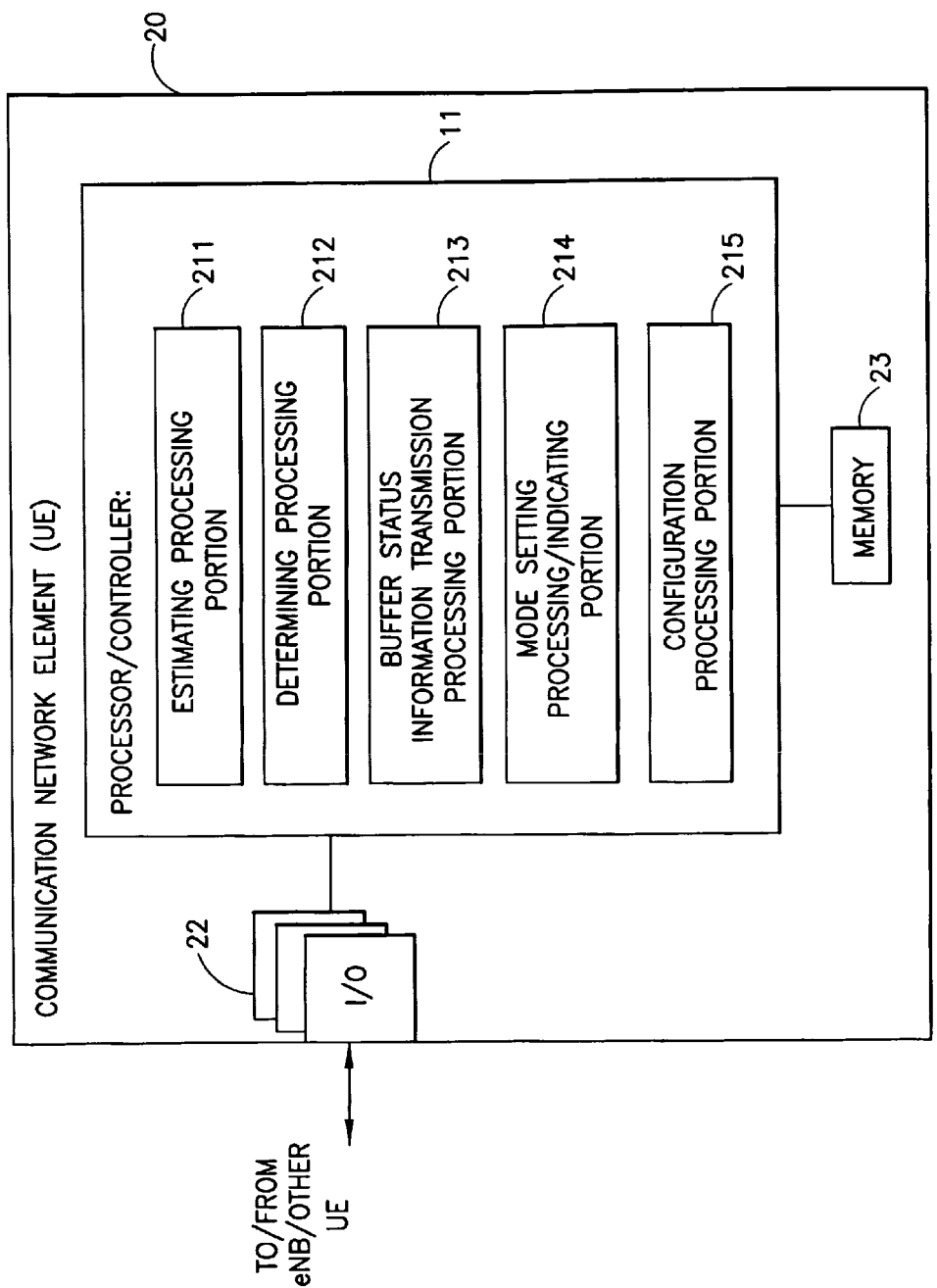
FIG. 7 shows a block circuit diagram of a communication network element including processing portions conducting functions according to examples of embodiments of the invention.

In FIG. 7, a block circuit diagram illustrating a configuration of a communication network element, such as of UE, is shown, which is configured to implement the processing as described in connection with the examples of embodiments of the invention, for example. It is to be noted that the communication network device or UE 20 shown in FIG. 7 may comprise several further elements or functions besides those described herein below, which are omitted herein for the sake of simplicity as they are not essential for understanding the invention. Furthermore, even though reference is made to a UE, the communication network element may be also another device having a similar function, such as a modem chipset, a chip, a module etc., which can also be part of a UE or attached as a separate element to a UE, or the like.

The communication network element or UE 20 may comprise a processing function or processor 21, such as a CPU or the like, which executes instructions given by programs or the like related to the buffer status reporting. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes transceiver or input/output (I/O) units connected to the processor 21. The I/O units 22 may be used for communicating with elements of the access network, such as a communication network control element like an eNB, and with other UEs, e.g. in a direct communication in a D2D mode. The I/O units 22 may be a combined unit comprising communication equipment towards several of the network element in question, or may comprise a distributed structure with a plurality of different interfaces for each network element in question. Reference sign 23 denotes a memory usable, for example, for storing data and programs to be executed by the processor 21 and/or as a working storage of the processor 21.

The processor 21 is configured to execute processing related to the above described mechanism for reporting buffer status information. In particular, the processor 21 comprises a sub-portion 211 as a processing portion which is usable as an estimating processing portion. The portion 211 may be configured to perform a processing according to step S10 according to FIG. 4, for example. Furthermore, the processor 21 comprises a sub-portion 212 as a processing portion which is usable as a determining processing portion. The portion 212 may be configured to perform a processing according to step S20 according to FIG. 4, for example. Moreover, the processor 21 comprises a sub-portion 213 as a processing portion which is usable as a buffer status transmission processing portion. The portion 213 may be configured to perform processing according to step S30 according to FIG. 4, for example. In addition, the processor 21 comprises a sub-portion 214 as a processing portion which is usable as a mode setting processing/indicating portion configured to set the communication network element in an offloading mode or a normal mode, and to indicate the set mode to the communication network control element. Moreover, the processor 21 comprises a sub-portion 215 as a processing portion which is usable as a configuration processing portion configured to receive and process configuration information from the communication network control element (e.g. the eNB) or the like defining logical channels or RBGs to be used in a determination of an actual buffer size or the like.

As described above, examples of embodiments of the invention concerning the reporting and processing of buffer status information when a communication via licensed and unlicensed spectrum is conducted are described to be implemented in UEs and eNBs. However, the invention is not limited to this. For example, examples of embodiments of the invention may be implemented in any wireless modems or the like.

According to a further example of embodiments of the invention, there is provided an apparatus comprising estimating processing means for estimating an offloading value indicating an amount of traffic which can be offloaded from a transmission over a licensed spectrum to a transmission over an unlicensed spectrum, determining processing means for determining a buffer size of at least one transmission buffer used in a transmission over the licensed spectrum and the unlicensed spectrum, and buffer status information transmission processing means for sending a buffer status information indicating the buffer size for transmission over the licensed spectrum under consideration of the estimated offloading value.

Moreover, according to an example of embodiments of the invention, there is provided an apparatus comprising a buffer status information receiving means for receiving and processing a buffer status information indicating a buffer size for transmission over a licensed spectrum, wherein the buffer status information considers an estimated offloading value indicating an amount of traffic which can be offloaded from a transmission over a licensed spectrum to a transmission over an unlicensed spectrum, resource determination means for determining, on the basis of the received buffer status information, required resources for a transmission over the licensed spectrum, and resource allocation means for allocating the determined resources to a transmission over the licensed spectrum.

According to a further aspect A, examples of embodiments of the invention are related to a method comprising receiving and processing a buffer status information indicating a buffer size for transmission over a licensed spectrum, wherein the buffer status information considers an estimated offloading value indicating an amount of traffic which can be offloaded from a transmission over a licensed spectrum to a transmission over an unlicensed spectrum, determining, on the basis of the received buffer status information, required resources for a transmission over the licensed spectrum, and allocating the determined resources to a transmission over the licensed spectrum.

According to a further aspect A1, in the method according to aspect A, there are further comprised receiving and processing, as the buffer status information, at least one of an actual buffer size of transmission buffers based on a combination of buffer sizes of different priority buffers of a communication network element, and a virtual buffer size which is calculated by subtracting a parameter corresponding to the estimated offloading value from the actual buffer size.

According to a further aspect A2, in the method according to aspect A1, there are further comprised receiving and processing buffer status information indicating a negative value for a virtual buffer size, wherein the method further comprises conducting a recognition processing for recognizing, when a negative value for the virtual buffer size is received, an availability of further resources for offloading to a transmission over the unlicensed spectrum.

According to a further aspect A3, in the method according to aspect A, there are further comprised receiving and processing a mode indication indicating whether a communication network element is set into an offloading mode where traffic is offloaded to a transmission over the unlicensed spectrum, or into a normal mode when offloading of traffic is stopped, wherein, when the mode of the communication network element is the offloading mode, the method further comprises interpreting one of indicated buffer sizes as a negative buffer size and subtracting the buffer size interpreted as a negative buffer size from a sum of other buffer sizes indicated in the buffer status information, and using the result of the subtraction for the determination of the required resources for the transmission over the licensed spectrum.

According to a further aspect A4, in the method according to aspect A1, there are further comprised receiving and processing a mode indication indicating whether a communication network element is set into an offloading mode where traffic is offloaded to a transmission over the unlicensed spectrum, or into a normal mode when offloading of traffic is stopped, wherein, when the mode of the communication network element is the offloading mode, the method further comprises restricting a virtual buffer size reporting by a communication network element and setting the offloading mode operation as a normal mode.

According to a further aspect A5, in the method according to aspect A, the buffer status information is related to at least one radio bearer group formed from one or more logical channels, wherein the method further comprises selecting logical channels or radio bearer groups which are to be used for determining the buffer size when offloading is executed by the communication network element, and sending an instruction to a communication network indicating the selected logical channels or radio bearer groups.

According to a further aspect B, examples of embodiments of the invention are related to a computer program product for a computer, comprising software code portions for performing the steps of any of aspects A and A1 to A5 when said product is run on the computer. The computer program product according to aspect B may comprise a computer-readable medium on which said software code portions are stored. Alternatively or additionally, the computer program product according to aspect B is directly loadable into the internal memory of the computer and/or transmittable via a network by means of at least one of upload, download and push procedures.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element may be any device, apparatus, unit or means by which a system user or subscriber may experience services from an access network, such as a mobile phone, personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a mechanism for reporting buffer status information to a communication network control element when transmission via both a licensed and an unlicensed spectrum is conducted and offloading of traffic is executed. After an offloading value indicating the amount of traffic which can be offloaded from a transmission over a licensed spectrum to a transmission over an unlicensed spectrum is estimated, the UE determines a buffer size of at least one transmission buffer used in a transmission over the licensed spectrum and the unlicensed spectrum. Then, buffer status information is sent to the eNB wherein the estimated offloading value is considered. The eNB can then allocate resources for the transmission over the licensed band while benefits by the offloading to the unlicensed band are considered in the resource allocation.

Although the present invention has been described herein before with reference to particular embodiments thereof, the present invention is not limited thereto and various modifications can be made thereto.

The invention claimed is:

1. An apparatus comprising:
an estimating processing portion configured to estimate an offloading value indicating an amount of traffic which can be offloaded from a first transmission over a licensed spectrum to a second transmission over an unlicensed spectrum,
a determining processing portion configured to determine a first buffer size of at least one transmission buffer to be used in the first transmission over the licensed spectrum, wherein the first buffer size is an actual buffer size of the at least one transmission buffer determined by combining buffer sizes of different priority buffers,
wherein the determining processing portion is further configured to calculate a second buffer size for a third transmission over the licensed spectrum under consideration of the estimated offloading value and the second buffer size is a virtual buffer size which is calculated by subtracting a parameter corresponding to the estimated offloading value from the actual buffer size, and
a buffer status information transmission processing portion configured to send buffer status information indicating the calculated second buffer size.

2. The apparatus according to claim 1, wherein the estimating processing portion is configured to estimate the offloading value on the basis of history information and a result of a throughput calculation related to a preceding offloading of traffic to the unlicensed spectrum.

3. The apparatus according to claim 1, wherein, when a connection for offloading traffic to the unlicensed spectrum is terminated or determined to be idle for a predetermined time, the buffer status information transmission portion is configured to send buffer status information based on the actual buffer size.

4. The apparatus according to claim 1, wherein, when the parameter corresponding to the estimated offloading value is greater than the actual buffer size, the buffer status information transmission portion is configured to send buffer status information indicating a negative virtual buffer size.

5. The apparatus according to claim 1, further comprising a mode setting processing portion configured to set a communication network element into one of an offloading mode when traffic is offloaded to the unlicensed spectrum, and a normal mode when offloading of traffic to the unlicensed spectrum is stopped, and
  a mode indicating processing portion configured to indicate the mode set for the communication network element together with the buffer status information.

6. The apparatus according to claim 1, wherein the buffer status information is related to at least one radio bearer group formed from one or more logical channels, wherein the apparatus further comprises a configuration processing portion configured to receive an instruction for selecting logical channels or radio bearer groups which are to be used for determining the buffer size when offloading is executed.

7. An apparatus comprising:
  a buffer status information receiving portion configured to receive and process buffer status information indicating a buffer size for transmission over a licensed spectrum, wherein the buffer size considers an estimated offloading value indicating an amount of traffic which can be offloaded from a first transmission over a licensed spectrum to a second transmission over an unlicensed spectrum,
  a resource determination portion configured to determine, on the basis of the received buffer status information, required resources for a third transmission over the licensed spectrum, and
  a resource allocation portion configured to allocate the determined resources to the third transmission over the licensed spectrum, wherein the buffer status information includes:
  a first buffer size of at least one transmission buffer to be used in the first transmission over the licensed spectrum and the first buffer size is an actual buffer size of transmission buffers based on a combination of buffer sizes of different priority buffers of a communication network element, and
  a second buffer size for the third transmission over the licensed spectrum and the second buffer size is a virtual buffer size that considers the estimated offloading value by subtracting a parameter corresponding to the estimated offloading value from the actual buffer size.

8. The apparatus according to claim 7, wherein the buffer status information receiving portion is configured to receive and process buffer status information indicating a negative value for a virtual buffer size, wherein the apparatus further comprises a recognition processing portion configured to recognize, when a negative value for the virtual buffer size is received, an availability of further resources for offloading to a transmission over the unlicensed spectrum.

9. The apparatus according to claim 7, further comprising a mode determination processing portion configured to receive and process a mode indication indicating whether a communication network element is set into an offloading mode where traffic is offloaded to a transmission over the unlicensed spectrum, or into a normal mode when offloading of traffic is stopped, wherein, when the mode of the communication network element is the offloading mode, the buffer status information receiving portion is further configured to interpret one of indicated buffer sizes as a negative buffer size and to subtract the buffer size interpreted as a negative buffer size from a sum of other buffer sizes indicated in the buffer status information, wherein the result of the subtraction is used by the resource determination portion for the determination of the required resources for the transmission over the licensed spectrum.

10. The apparatus according to claim 7, further comprising a mode determination processing portion configured to receive and process a mode indication indicating whether a communication network element is set into an offloading mode where traffic is offloaded to a transmission over the unlicensed spectrum, or into a normal mode when offloading of traffic is stopped, wherein, when the mode of the communication network element is the offloading mode, the buffer status information receiving portion is further configured to restrict a virtual buffer size reporting by a communication network element and to set the offloading mode operation as a normal mode.

11. The apparatus according to claim 7, wherein the buffer status information is related to at least one radio bearer group formed from one or more logical channels, wherein the apparatus further comprises a configuration portion configured to select logical channels or radio bearer groups which are to be used for determining the buffer size when offloading is executed by the communication network element, and to send an instruction to a communication network indicating the selected logical channels or radio bearer groups.

12. A method comprising:
  estimating an offloading value indicating an amount of traffic which can be offloaded from a first transmission over a licensed spectrum to a second transmission over an unlicensed spectrum,
  determining a first buffer size of at least one transmission buffer to be used in the first transmission over the licensed spectrum, wherein the first buffer size is an actual buffer size of the at least one transmission buffer determined by combining buffer sizes of different priority buffers,
  calculating a second buffer size for a third transmission over the licensed spectrum under consideration of the estimated offloading value and the second buffer size is a virtual buffer size which is calculated by subtracting a parameter corresponding to the estimated offloading value from the actual buffer size, and
  sending buffer status information indicating the calculated second buffer size.

13. The method according to claim 12, wherein the offloading value is estimated on the basis of history information and a result of a throughput calculation related to a preceding offloading of traffic to the unlicensed spectrum.

14. The method according to claim 12, wherein, when a connection for offloading traffic to the unlicensed spectrum is terminated or determined to be idle for a predetermined time, buffer status information based on the actual buffer size is sent.

15. The method according to claim 12, wherein, when the parameter corresponding to the estimated offloading value is greater than the actual buffer size, buffer status information indicating a negative virtual buffer size is sent.

16. The method according to claim 12, further comprising setting a communication network element into one of an offloading mode when traffic is offloaded to the unlicensed spectrum, and a normal mode when offloading of traffic to the unlicensed spectrum is stopped, and indicating the mode set for the communication network element together with the buffer status information.

17. The method according to claim 12, wherein the buffer status information is related to at least one radio bearer group formed from one or more logical channels, the method further comprising receiving and executing an instruction for selecting logical channels or radio bearer groups which are to be used for determining the buffer size when offloading is executed.

* * * * *